United States Patent
Bracegirdle

(10) Patent No.: US 9,222,268 B1
(45) Date of Patent: Dec. 29, 2015

(54) SYSTEM AND METHOD FOR MAKING STRESS-COMPOSITE STRUCTURAL MEMBERS

(71) Applicant: Paul E. Bracegirdle, Newtown, PA (US)

(72) Inventor: Paul E. Bracegirdle, Newtown, PA (US)

(*) Notice: Subject to any disclaimer, the term of this patent is extended or adjusted under 35 U.S.C. 154(b) by 425 days.

(21) Appl. No.: 13/626,862

(22) Filed: Sep. 25, 2012

Related U.S. Application Data

(63) Continuation-in-part of application No. 12/723,612, filed on Mar. 12, 2010, now Pat. No. 8,297,026.

(60) Provisional application No. 61/227,433, filed on Jul. 21, 2009.

(51) Int. Cl.
*E04F 15/00* (2006.01)
*E04F 15/10* (2006.01)
*B29C 39/02* (2006.01)
*B29C 39/10* (2006.01)

(52) U.S. Cl.
CPC ............ *E04F 15/10* (2013.01); *B29C 39/028* (2013.01); *B29C 39/10* (2013.01)

(58) Field of Classification Search
CPC ........ E04F 15/10; B29C 39/028; B29C 39/10
USPC .......................................................... 264/228
See application file for complete search history.

(56) References Cited

U.S. PATENT DOCUMENTS

| | | | | |
|---|---|---|---|---|
| 3,604,174 | A * | 9/1971 | Nelson, Jr. | 52/601 |
| 4,979,992 | A * | 12/1990 | Bache | 106/644 |
| 5,435,949 | A * | 7/1995 | Hwang | 264/51 |
| 2006/0147681 | A1 * | 7/2006 | Dubey | 428/192 |

* cited by examiner

*Primary Examiner* — Galen Hauth
(74) *Attorney, Agent, or Firm* — LaMorte & Associates, P.C.

(57) ABSTRACT

A system and method of manufacturing a synthetic construction element that replaces wood lumber. A synthetic composition is provided containing cementitious material, aggregate, fibers, and low-density particulate material. The density of the synthetic composition is controlled by varying the volume of the low-density particulate material in the mix. Reinforcement elements are provided. The reinforcement elements are positioned within the synthetic construction element and are stressed in tension. The reinforcement elements and the shape of the synthetic construction element are symmetrically disposed on either side of an imaginary mid-plane and maintain the synthetic construction element in compression.

16 Claims, 5 Drawing Sheets

SYSTEM AND METHOD FOR MAKING STRESS-COMPOSITE STRUCTURAL MEMBERS

RELATED APPLICATIONS

This patent application is a Continuation-In-Part of patent application Ser. No. 12/723,612, filed Mar. 12, 2010, that claims the benefit of Provisional Patent Application No. 61/227,433, entitled Decking System And Method Having Integrated Plank And Framing Members, filed Jul. 21, 2009.

BACKGROUND OF THE INVENTION

1. Field of the Invention

In general, the present invention relates to synthetic building materials that can be used in place of traditional lumber and wood products. More specifically, the present invention relates to the manufacture and use of cement-based, pre-stressed or post-tensioned compositions that are formed into synthetic lumber.

2. Prior Art Description

Wood has been used as a building material throughout human history. Wood is a nearly perfect building material. It is lightweight, strong, and flexible. Wood can be cut, carved, and sanded into almost any shape using only simple handheld tools. Furthermore, in the past, wood has been both plentiful and inexpensive. However, as forests retreat, wood is becoming increasingly more expensive. Additionally, the quality of wood has been decreasing as younger trees have been forested to meet the world's demand for wood products.

Although wood is a highly versatile building material, it does have some disadvantages. Wood, being an organic material, is vulnerable to rot, insect damage and degradation from both the elements and a host of microorganisms. Accordingly, wood must be treated and/or painted, especially if it is left exposed to the elements. Additionally, although wood has an average strength, no two pieces of wood have the same properties. The strength, flexibility, density and even appearance of a piece of wood depends largely upon the type of tree from which the wood came, the part of the tree from where it was cut, the direction of grain in the wood, and the number of knots and other imperfections that are present in the wood.

In an attempt to make building materials that are more uniform and more resistant to the elements, synthetic compositions have been used in place of wood. Many traditional wooden products, such as deck components, are now made from synthetic materials. The synthetic compositions used to make traditional wood building products vary. If the building product is ornamental, it may be molded from plastic. However, if the building product must withstand static or dynamic loading, the building product is typically made by mixing either filler or wood with a cement or a plastic binder. Synthetic building products made from such compositions are typically much more resistant to rot and insects than natural wood. Furthermore, such synthetic building products are also far more uniform in strength, flexibility, density, and appearance from piece to piece. However, such synthetic building products are typically heavier, subject to creep, more brittle, and much weaker than natural wood products. Such synthetic building materials also tend to be considerably more expensive than those made from natural wood. Accordingly, many synthetic building products have not found wide acceptance in the marketplace.

The products and uses for such building materials comprise many applications. One of the larger market applications for synthetic building materials is the market for outdoor decks and boardwalks. The construction techniques used to build decks and boardwalks are complex and involve the use of many columns, piers, beams, joists, and deck planks. Consequently, considerable materials, fasteners, and labor are required to construct decks and boardwalks.

A need therefore exists for a new composition for synthetic structural building materials that more closely mirrors the strength, flexibility, span distance, and tensile strength of wood, while still providing better resistance to weathering and insects. A need also exists for a composition and shape for such synthetic structural building materials that can be manufactured inexpensively so as to compete with the costs to design and build with the natural wood products. A need further exists for a construction system that simplifies the construction of deck and boardwalk projects. These needs are met by the present invention as described and claimed below.

SUMMARY OF THE INVENTION

The present invention is a system and method of manufacturing synthetic structural elements that can be used to replace lumber. A synthetic composition is provided that is comprised of cementitious material, synthetic fibers, and both regular and low-density particulate material. In some instances, at least one polymer may be added to improve performance. The density of the synthetic composition is controlled by varying the volume of the low-density particulate material in the mix.

Reinforcement elements are provided. The reinforcement elements can be pre-stressed or post-stressed in tension. The synthetic compound is molded around the reinforcement elements to form a construction element of a particular shape. If the reinforcement elements are pre-stressed, the pre-stress forces are removed from the reinforcement elements after the synthetic compound cures. If the reinforcement elements are post-stressed, the post-stress forces are applied after a construction element is formed from the synthetic compound cures. Such post-stressed reinforcement can be obtained by inserting reinforcement elements through holes or conduits in a construction element and then applying tension. The reinforcement elements are located within the synthetic compound such that the reinforcement elements are symmetrical about an imaginary mid-plane that runs the length of the structural element. The symmetrical location of the reinforcement elements within each member is important to control the straightness and also the ultimate load bearing capacity of the construction elements being made. The proper location of the symmetrical stress reinforcements provides a bi-directional straightness control over the entire length of the construction element. Small off-sets to symmetrical alignment locations of the stress reinforcement, or a variation in the induced stress to each stress reinforcement, can be made to impart a small camber effect or sweep effect to the final construction element, thereby providing a reduction in deflection or curvature in the final application if required.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention system and method can be used to make a variety of building materials, such as framing and planking components, the present invention is especially well suited for use in making building materials that remain exposed to the elements. Accordingly, the exemplary embodiment of the present invention illustrates and describes a system and method that is used to make footings, posts, beams, joists, and deck planks for indoor or outdoor framing or planking construction. Such an exemplary embodiment is selected to set forth one of the best modes contemplated for the invention. However, the use of such an exemplary embodiment should not be considered a limitation on the scope of the claims.

Figure 1:
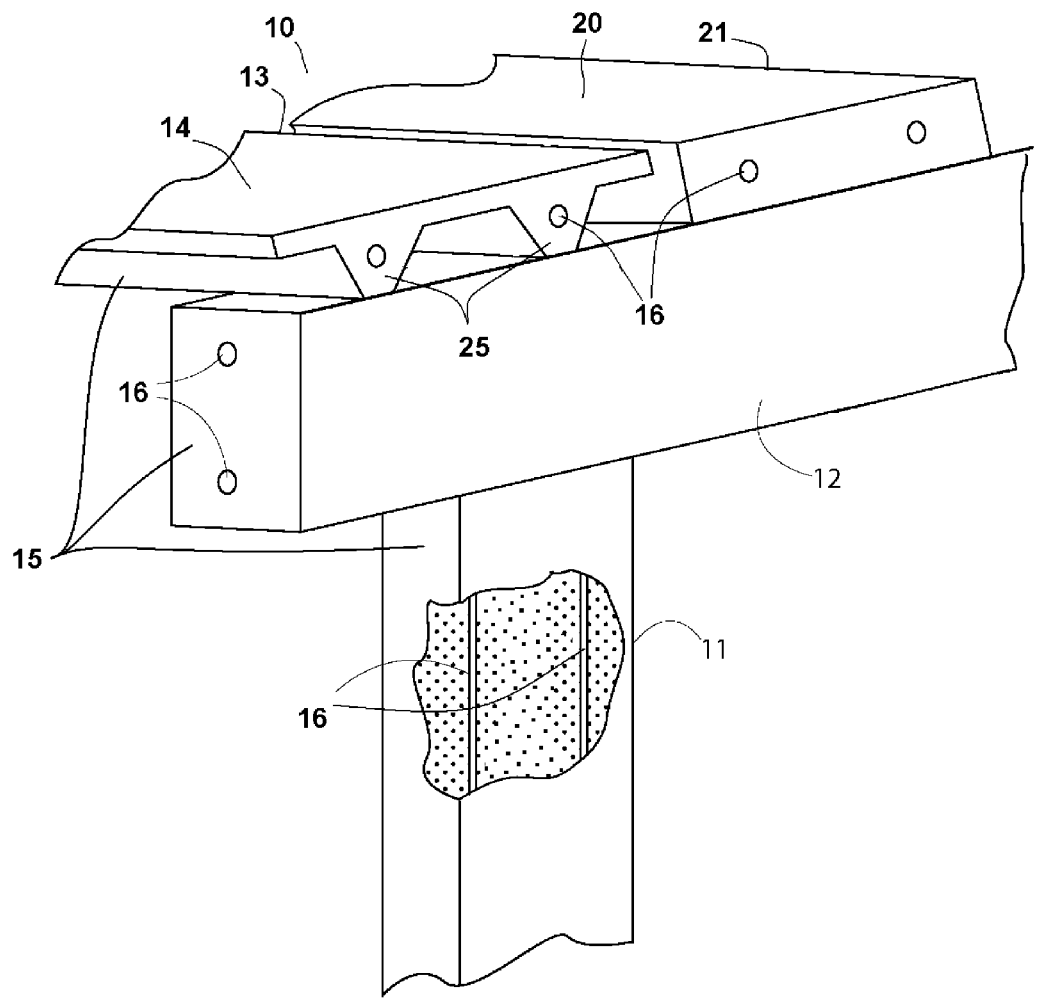
FIG. 1 is a partially fragmented perspective view of an exemplary embodiment of a construction containing a pier, a crossbeam, a joist and a deck plank in accordance with the present invention.

Referring to FIG. 1, a decking framework 10 is shown that is made from composite structural elements 15. The composite structural elements 15 shown include piers 11 and beams or joists 12 that are manufactured in accordance with the present invention. Two exemplary types of deck planks 13, 21 are shown. The deck planks 13, 21 extend over the beams or joists 12 to create planar walking surfaces 14 and 20, respectively. It will therefore be understood that the deck planks 13, 21 provide both an integrated framing member and a walking surface in single structural elements.

Figure 2A:
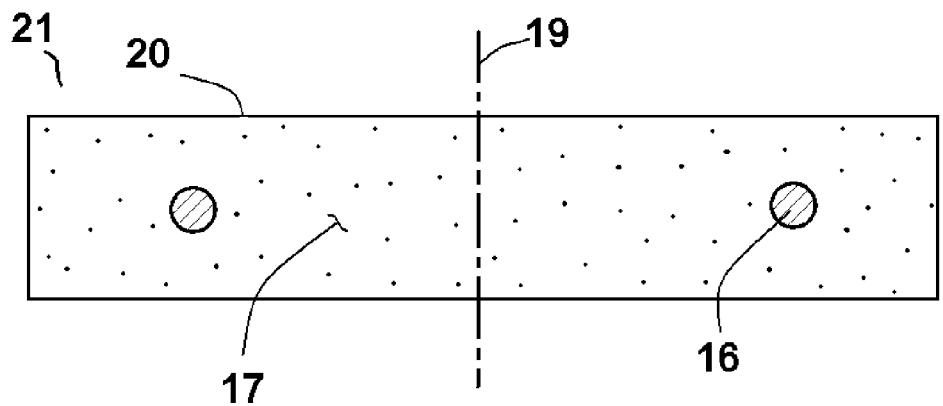
FIG. 2A is a cross-section of a simple embodiment of a deck plank.

Referring to FIG. 2A, the simpler decking plank 21 from FIG. 1 is shown in cross-section. The decking plank 21 is formed in the same rectangular shape as a standard plank or wood lumber. As viewed in cross-section, the decking plank 21 is symmetrically disposed around an imaginary vertical mid-plane 19. The vertical mid-plane 19 runs the length of the decking plank 21 between its two ends. The vertical mid-plane 19 is oriented to be perpendicular to the planar walking surface 14.

The decking plank 21 has two reinforcement elements 16 that are symmetrically disposed on either side of the imaginary vertical mid-plane 19. The importance of the symmetry about the mid-plane 19 is later explained. In the embodiment of FIG. 2A, symmetry of the reinforcement elements 16 are about the vertical mid-plane 19. Symmetry can also be created about a horizontal mid-plane, as will later be explained.

Figure 2B:
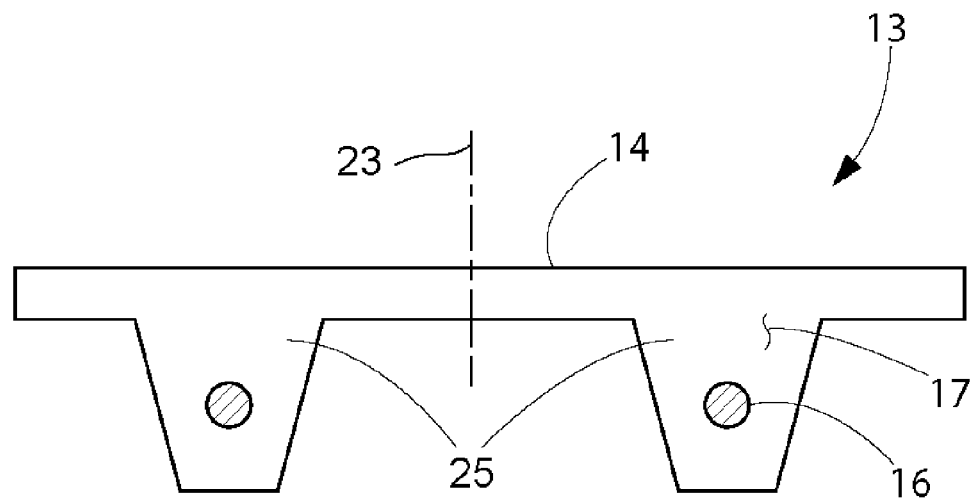
FIG. 2B is a cross-section of a complex embodiment of a deck plank.

Referring to FIG. 2B, an engineered deck plank 13 is shown. The engineered deck plank 13 has a flat top walking surface 14 that is supported by two ribs 25 that extend downwardly under the walking surface 14. Each of the ribs 25 is reinforced by at least one of the reinforcement elements 16.

The engineered deck plank 13 also has an imaginary vertical mid-plane 23 that runs the length of the deck plank 13 between its two ends. The engineered deck plank 21 is symmetrically disposed on either side of the imaginary mid-plane 23. Furthermore, the reinforcement elements 16 are symmetrically disposed on either side of the imaginary mid-plane 23. The deck plank 13 illustrated has two support ribs 25. Any number of support ribs 25 can be used depending upon the width of the walking surface 14. However, they must remain symmetrical about the imaginary mid-plane 23.

The support ribs 25 run the length of the flat walking surface 14. The support ribs 25 provide the flat walking surface 14 with the rigidity and strength comparable to a plank of wood. However, by using support ribs 25, the weight of the deck plank 13 is kept to a minimum, thereby enabling the weight of the deck plank 13 to be comparable in weight to a wooden plank and supporting frame.

Referring to FIGS. 1, 2A and 2B, it will be understood that reinforcement elements 16 are disposed within the deck planks 13, 21. The reinforcement elements 16 are symmetrically disposed on either side of an imaginary mid-plane 19 (FIG. 2A), 23 (FIG. 2B). The symmetrical reinforcement elements 16 are preferably stressed before the final formation of the deck planks 13, 21. However, the reinforcement elements 16 can also be added to the deck planks 13, 21 after the formation of the deck planks 13, 21 and then tensioned. If the reinforcement elements 16 are added after the formation of the deck planks 13, 21, then the deck planks 13, 21 are fabricated with holes to accommodate the reinforcement elements 16 when they are added.

The symmetric reinforcement elements 16 can be steel rods or steel wire. However, lightweight non-metal alternatives, such as carbon fiber rods, basalt rods or fiberglass rods can be used. If the reinforcement elements 16 are stressed during the fabrication of a composite structural element 15, then a tensioning force is applied to the reinforcement elements 16 inside the composite structural element 15 before it is cured. If the reinforcement elements 16 are added to a composite structural element 15 after its formation, then openings are formed in the deck planks 13, 21 or other composite structural elements that enable the reinforcement elements 16 to be added and tensioned retroactively.

The deck planks 13, 21 are fabricated from a synthetic composition and reinforced by the reinforcement elements 16. The synthetic composition is fabricated into straight deck planks 13, 21. However, if the reinforcement elements 16 are not symmetrically disposed about the imaginary vertical mid-axis 19, 23, the forces applied to the deck planks 13, 21 by the reinforcement elements 16 would be unbalanced. As a result, the deck planks 13, 21 would begin to bend or twist over time as the synthetic composition 17 creeps under the stress of the reinforcement elements 16. As the deck planks 13, 21 bend and/or twist, the tension in one or both of the reinforcement elements 16 can be reduced. As the stresses in the reinforcement elements 16 become reduced, the strength of the deck planks 13, 21 also becomes reduced. This can undermine the design of the entire decking framework 10. However, by placing the reinforcement elements 16 symmetrically about each imaginary mid-plane 19, 23, the forces are balanced on either side of the mid-plane 19, 23 and the deck planks 13, 21 remain straight. Once the synthetic composition 17 is cured and tensioned by the reinforcement elements 16, the resulting deck plank 13, 21 has strength, flexibility and straightness characteristics that are comparable or better than natural wood.

Both the piers 11 and crossbeams or joists 12 may also contain symmetrical reinforcement elements 16 similar to those found in the deck planks 13, 21. Again, the reinforcement elements 16 are symmetrically disposed within the piers 11 and joists 12, so that the tensioning in the reinforcement elements 16 do not cause the piers 11 or joists 12 to twist or warp.

In order for the piers 11, cross beams or joists 12 and/or deck plank 13, 21 to mimic natural wood, all the composite structural elements 15 preferably have a pre-stress reinforcing bond at a compressive strength of at least 2,500 PSI (17 Mpa) and a final compressive strength of at least 3,000 PSI (21 Mpa) along with a density under 120 pounds (54.5 kg) per cubic foot. Although the density of each pier 11, cross beam or joist 12 and/or deck plank 13, 21 can be uniform, it need not be. Less material can be used if the density of each element is made greater closest to the reinforcement elements 16 in order to provide proper bond. However, less dense compositions can be used in other areas.

The use of reinforcement elements 16 provide the piers 11, cross beams or joists 12 and deck planks 13, 21 with the wood-like ability to bend slightly without breaking. In the present invention, the internal reinforcement elements 16 are manufactured within the deck planks 13, 21, the joists 12, and the piers 11. However, in order for the internal, symmetrical reinforcement elements 16 to have effect, they must bear some of the tension loads while being encased in the synthetic composition 17. Consequently, the cured synthetic composition 17 must be flexible enough to allow stresses to influence the internal reinforcement elements 16. However, the cured synthetic composition 17 must not crack or otherwise break as it flexes. It is, therefore, important that the cured synthetic composition 17 be minimally, but somewhat, flexible. However, the window of proper flexibility is small. If the cured synthetic composition 17 is made too rigid, the cured synthetic composition 17 may crack when loaded. If the cured synthetic composition 17 is made too flexible, its compressive strength may be too low and the internal reinforcement elements 16 will have to bear the entire load. Furthermore, the synthetic composition may fail to bond to the reinforcement elements 16. Either way, the resulting components would have strength and capacity much lower than that of natural wood and would have little commercial value. Furthermore, if the reinforcement elements 16 are not located in symmetry, the ultimate performance would not be optimum for the reasons previously presented.

Small alignment off-sets can be intentionally made in the position of the reinforcement elements 16 in order to intentionally warp a composite structural element. For instance, floor joists or planks can be fabricated with a slight camber to compensate for load deformation and ensure a perfectly flat floor surface.

Figure 3:
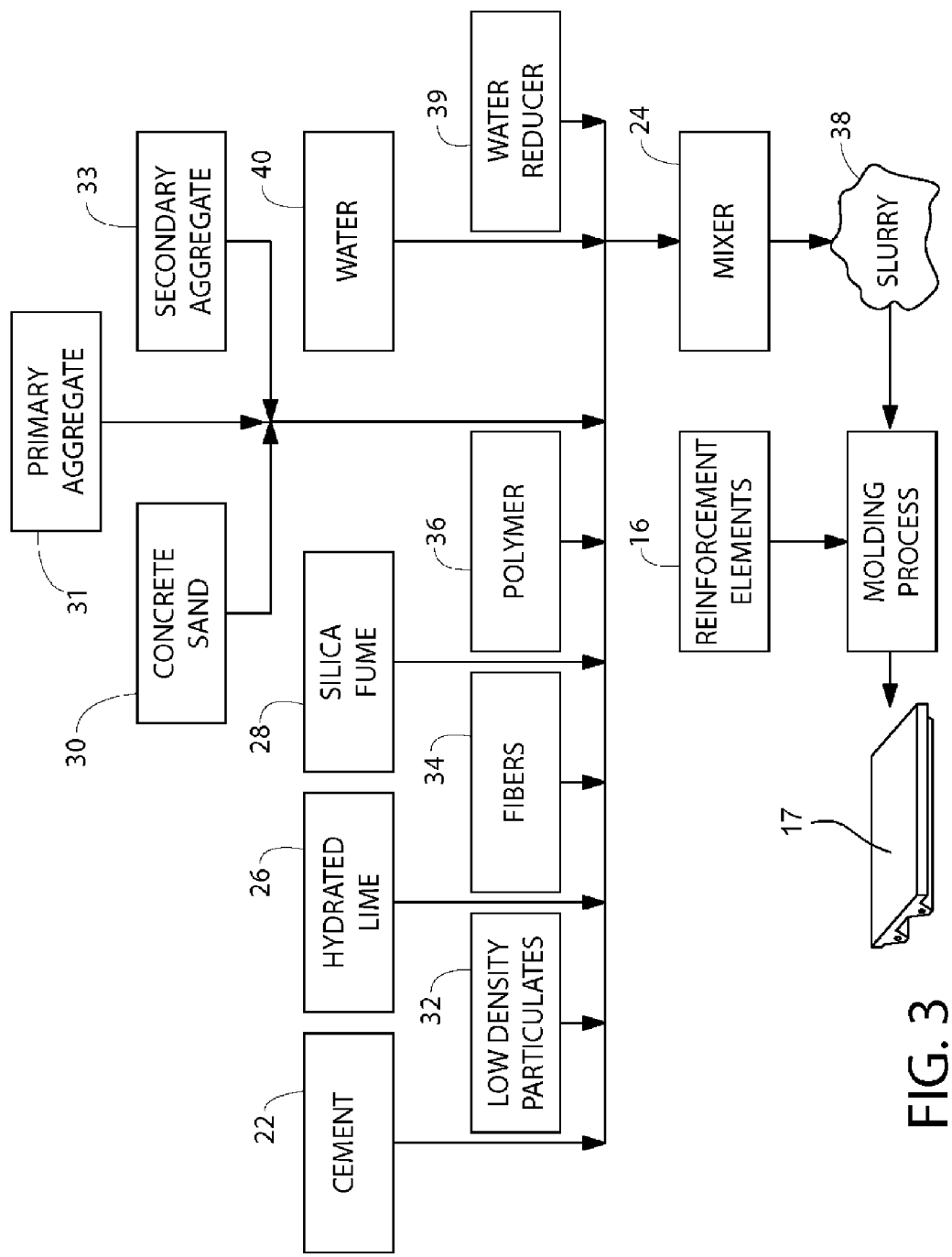
FIG. 3 is a block diagram schematic that illustrates an exemplary composition and method of manufacture for construction elements.

Referring to FIG. 3, details on the cured synthetic composition 17 are presented. The cured synthetic composition 17 is comprised primarily of cementitious material 22. The cementitious material 22 can be type "1", type "2" or type "3" cement. Other variations of cement products such as type "K" or even ultra-high-strength cementitious ingredients such as silica fume or magnesia may also be used. More eco-friendly, environmentally sustainable pozzolans, or cement-like products such as fly ash or finely ground blast furnace slag may be used as well. The cementitious material 22 is added into a mixer 24 in amounts between 600 and 900 pounds (273 kg to 409 kg) per cubic yard. To help the cementitious material 22 cure with proper strength, silica fume 28 and fine aggregate are added to the mixer 24. The fine aggregate may be a blend of concrete sands 30 and/or lightweight aggregate 31. The silica fume 28 may be added in amounts between 50 and 100 pounds (23 kg to 46 kg) per cubic yard. Concrete sand 30 is added at a concentration of between 700 (318 kg) and 1,000 (454 kg) pounds per cubic yard. Secondary sands or small aggregate 33 are added between 100 pounds (45 kg) and 300 pounds (135 kg) per cubic yard.

To decrease the density of the mix, a low density aggregate and/or particulate 32 is added. The low density particulate 32 can be perlite, vermiculite, plastic beads, glass, or even particles of polymer foam. The low-density particulates 32, such as perlite, are added in amounts between 150 pounds (68 kg) and 250 pounds (114 kg) per cubic yard of the mixture. The purpose of the low density particulate 32 is to decrease the density of the cured synthetic composition 17 so that it cures with a density close to that of treated wood.

To increase the flexural strength of the cured synthetic composition 17, reinforcement fibers 34 are added. The reinforcement fibers 34 can be metal or cut synthetic fibers, such as those that can be obtained from virgin polymer fiber sources of nylon or polyvinyl alcohol (PVA) or even recycled carpeting. The reinforcement fibers are added in amounts from about 1 to about 10 pounds (0.45 kg to 4.5 kg) per cubic yard. Although PVA fiber is preferred, synthetic and other reinforcing fibers from other sources can also be used. A method of obtaining such chopped reinforcement fibers is described in U.S. Pat. No. 7,563,017 of Paul Bracegirdle, entitled Process for Mixing Congealable Materials Such as Cement, Asphalt, and Glue with Fibers from Waste Carpet, the disclosure of which is incorporated into this application by reference.

Water 40 is added to the mixture to produce a moldable uncured slurry 38. Approximately, 300 pounds (136 kg) to 400 pounds (182 kg) of water 40 per cubic yard will produce the needed consistency and proper water-cement or water-pozzolan ratio. A typical, nominal solids content water reducing admixture 39, in amounts of approximately 0.5 gallon (1.9 liters) to 2.5 gallons (2.5 liters) per cubic yard, can be added to the mixture to ensure more even mixing, improve flow, reduce water content and increase strength. Other admixtures such as accelerators, retarders and air entraining agents may be added to improve performance for the casting operations and other methods that may be used to form such stressed synthetic building products.

Once all the ingredients are added into the mixer 24, the uncured slurry 38 is mixed to the proper consistency. Prior to the uncured slurry 38 being directed into a mold, the reinforcement elements 16, are placed at symmetrical locations within the mold. The internal reinforcement elements 16 can be metal wire, a cable or a bar. However, it is preferred that the internal reinforcement elements 16 be indented or deformed high tensile wire or strands. As has been mentioned, the symmetrically located reinforcement elements 16 used are stressed prior to the curing of the slurry 17. Alternatively, the slurry 38 can be molded and cured, leaving holes where the reinforcement elements 16 can be later added and tensioned.

Depending upon the amount of water 40 or water reducer 39 used in the uncured slurry 38, the uncured slurry 38 can be produced as thin slurry or even a self-consolidating mix, suitable for simple pour-in molding techniques. The slurry 38 is then poured into the mold and allowed to cure by any means. The resulting components with the internal reinforcement elements 16 can then be cut to length after molding. Shorter lengths are preferred for consumer components that will be manually lifted and carried. Longer lengths or wider sections can be made for large beams, joists or planks that will be lifted and installed by equipment.

During the molding process, the uncured slurry 38 can be formed into a desired shape around the internal, symmetrically located reinforcement elements 16. The uncured slurry 38 is then either allowed time to cure or is actively heated, directly or indirectly, or steamed which reduces curing time. The final result is building materials, such as piers, columns, crossbeams, joists, planks and decking planks or support tees, made from the cured synthetic composition 17. Alternatively, the reinforcement elements 16 are added through holes retroactively and then tensioned.

In the system illustrated in FIG. 3, all materials are mixed together in a mixer 24 prior to molding. As such, the resulting synthetic composition has a uniform density throughout. As has been previously mentioned, various construction components can be made lighter by varying the density of the synthetic composition in different areas of the components.

In the manufacturing process illustrated in FIG. 3, it will be understood that the density of the slurry 38 being used for molding is controlled greatly by the volume of the low density particulate 32 added to the composition. Thus, by reducing the volume of low-density particles 32, the overall density of the slurry 38 can be increased. Conversely, by increasing the volume of low-density particles 32, the overall density of the slurry 38 can be decreased.

Figure 4:
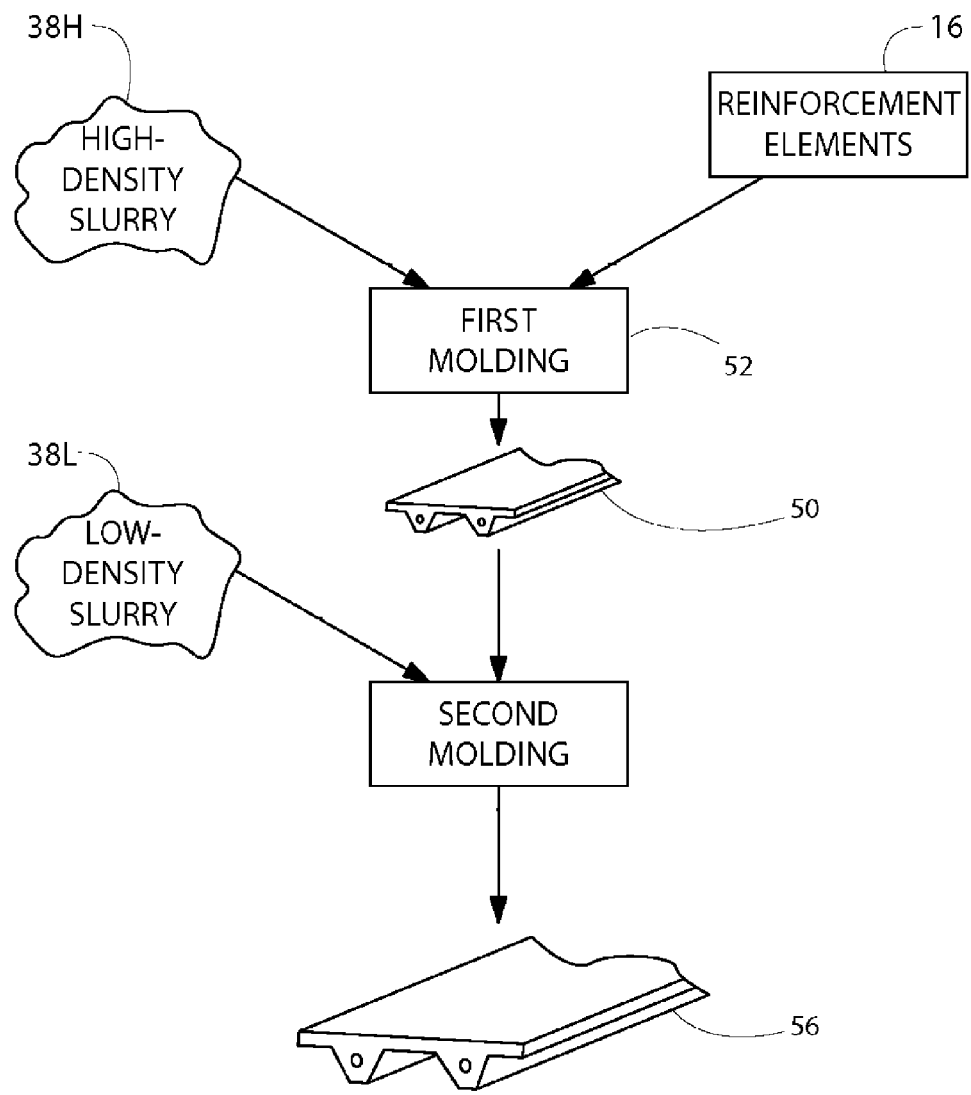
FIG. 4 is a block diagram schematic that illustrates an exemplary method of manufacture for construction elements having variable densities.

Referring to FIG. 4 in conjunction with FIG. 3, a method of making a construction element 56 with high density and low-density sections is explained. Slurry 38 is readied for molding using the methodology previously explained in conjunction with FIG. 3. By varying the volume of low-density particulate 32, the slurry 38 can be made into high-density slurry 38H or low-density slurry 38L.

The high-density slurry 38H is molded into an incomplete form 50 around reinforcement elements 16 in a mold 52. The reinforcement elements 16 are symmetrically placed and pre-stressed. The high-density slurry 38H is allowed to cure or at least partially cure. Consequently, the reinforcement elements 16 are encapsulated in an unfinished body of high-density material. The incomplete form 50 is therefore present in the mold 52. Low-density slurry 38L is then poured over the incomplete form 50 in the mold 52. The mold 52 creates the final form of the construction element 56, such as a pier, post or decking tee. After the low-density slurry 38L and the high-density slurry 38H cures, the construction element 56 is removed from the mold. The result is a construction element that has high-density material surrounding and bonded to the symmetrical reinforcement elements 16 and low-density material at other places.

Figure 5:
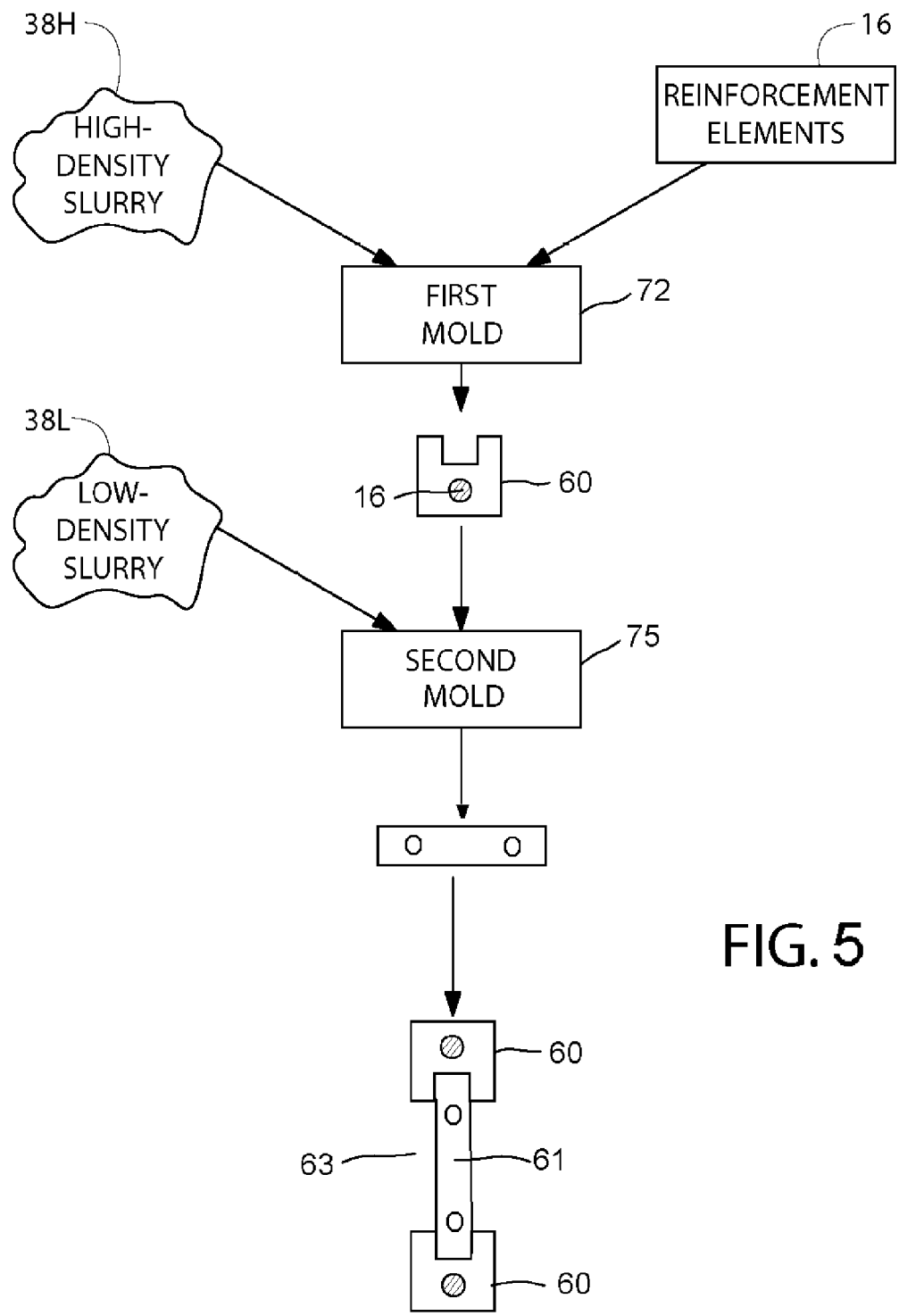
FIG. 5 is a block diagram schematic that illustrates an exemplary method of manufacture for construction elements made from post-manufacture assembly, with or without having variable densities.

Referring to FIG. 5, a method of making a complex composite structural element 63 is provided. Slurry 38 is readied for molding using the methodology previously explained in conjunction with FIG. 3. The slurry can be high density slurry 38H or low density slurry 38L depending upon the amounts of low density particulates used to create the slurry.

The high-density slurry 38H is molded into a 'flange' form 60 around reinforcement elements 16 in a mold 72. The reinforcement elements 16 are symmetrically placed and pre-stressed. The high-density slurry 38H is allowed to cure or at least partially cure. Consequently, the reinforcement elements 16 are encapsulated and bonded in an unfinished body of high-density material. The complete form 60 is therefore present in the mold 72 and removed after curing.

Low-density slurry 38L is then poured into web form 61 in the second mold 75. The web form 61 is shown with reinforcement elements, however, it should be understood that these reinforcement elements are optional and need not be used.

Once the web form 61 is cured, the two flange forms 60 are attached to the ends of the web form 61. The result is a post-curing and post-manufacture assembled composite structural element 63 that has high-density material in the flanges and low-density material in the web. In the completed composite structural element 63, the reinforcement elements 16 are symmetrically disposed so the composite structural element 63 will not warp. The post-manufacture assembly of the composite structural element 63 can be completed using glue or any similar item or means to connect the two flanges 60 to the central web 61.

In FIG. 5, it will be understood that the composite structural element has a long mid-axis 65 as well as a short mid-axis 67. The reinforcement elements 16 are symmetrically disposed around both mix-axii 65, 67. As such, the composite structural element 63 is stable and will maintain a straight. However, it should be understood that in some applications, it may be desirable to create a composite structural element that contains a certain camber or sweep. For such situations, the reinforcement elements 16 can be placed in non-symmetrical positions, relative to the long axis 65 and/or the short axis 67. This will cause uneven compression forces in the composite structural element and will bias the composite structural element into a camber or sweep.

It will be understood that the embodiments of the present invention that are shown are merely exemplary and that a person skilled in the art can make many variations to those embodiments. For instance, the present invention can be made into many other products, such as building and framing lumber, timbers, posts, and railings, in addition to the decking piers, beams, joists, planks and decking tees that are illustrated. Furthermore, additives, such as colorants, mold inhibitors, polymers, crystalline admixtures and the like can also be added to the disclosed compositions. Alternatively, the surface of the planks or decking tees or channels can be stamped, embossed or ground smooth and stained or painted during or after curing or even in the field once installed. Moreover, other methods of similar composition manufacturing techniques, such as dry-pack methods, flat-bed in-situ pre-casting, extrusion and sawn in-place products may be employed. All such variations, modifications, and alternate embodiments are intended to be included within the scope of the present invention as defined by the claims.

What is claimed is:

1. A composite structural element having a first end and an opposite second end, wherein said composite structural element is symmetrically formed about an imaginary mid-plane that runs from said first end to said second end, said composite structural element comprising:
   a deck plank having a flat top surface;
   a plurality of ribs that extend downwardly from said deck plank opposite said flat top surface, wherein said ribs run parallel to said imaginary mid-plane and are symmetrically disposed about said imaginary mid-plane;
   reinforcement elements extending through said ribs, wherein said reinforcement elements run parallel with said imaginary mid-plane in an arrangement that is symmetrical about said imaginary mid-plane, and wherein said reinforcement elements are pre-stressed in tension;
   wherein said decking plank and said ribs are fabricated from a composition containing cementitious material, synthetic fibers, and particulate material, wherein said composition has a density no greater than 120 pounds per cubic foot.

2. The composite structural element according to claim 1, wherein said flat top surface that runs perpendicular to said imaginary mid-plane between said first end and said second end.

3. The composite structural element according to claim 1, wherein said synthetic fibers include polyvinyl alcohol fibers.

4. The composite structural element according to claim 1, wherein said composition further includes at least one polymer.

5. The composite structural element according to claim 1, wherein said composition further includes sand, curing agents and aggregate.

6. The composite structural element according to claim 1, wherein said particulate material is selected from a group consisting of perlite, vermiculite, glass beads and synthetic foam.

7. The composite structural element according to claim 5, wherein said curing agents are selected from a group consisting of hydrated lime and silica fume.

8. The composite structural element according to claim 1, wherein said cementitious material is selected from a group consisting of cement, pozzolans, fly ash, magnesia and finely ground blast furnace slag.

9. A method of manufacturing a synthetic deck plank that can be used to replace a wood deck plank, said method comprising the steps of:
 providing reinforcement elements that are symmetrically disposed on both sides of an imaginary mid-plane;
 mixing a composition containing cementitious material, synthetic fibers, and low density particulate material;
 molding said composition into a selected shape of a deck plank, wherein said selected shape of a deck plank is symmetrically disposed about said mid-plane, has a flat top surface, and a plurality of ribs that extend downwardly from said deck plank opposite said flat top surface, wherein said ribs run parallel to said imaginary mid-plane, and wherein said reinforcement elements are disposed within said ribs; and
 applying tensioning forces to said reinforcement elements, therein creating stressed reinforcement elements that retain said deck plank in compression.

10. The method according to claim 9, wherein said composition has a density no greater than 120 pounds per cubic foot.

11. The method according to claim 10, wherein said synthetic fibers include polyvinyl alcohol fibers.

12. The method according to claim 10, wherein said composition further includes at least one polymer.

13. The method according to claim 10, wherein said composition further includes sand, curing agents and aggregate.

14. The method according to claim 10, wherein said particulate material is selected from a group consisting of perlite, vermiculite, glass beads and synthetic foam.

15. The method according to claim 13, wherein said curing agents are selected from a group consisting of hydrated lime and silica fume.

16. The method according to claim 10, wherein said cementitious material is selected from a group consisting of cement, pozzolans, fly ash, magnesia and finely ground blast furnace slag.

* * * * *